United States Patent [19]

Monhardt et al.

[11] 4,452,565
[45] Jun. 5, 1984

[54] CONTAINMENT STRUCTURE

[75] Inventors: Richard J. Monhardt, Glastonbury; Alfred B. Orr, West Suffield, both of Conn.; Emile J. Premont, South Hadley, Mass.; Joseph B. Wright, Somers, Conn.

[73] Assignee: United Technologies Corporation, Hartford, Conn.

[21] Appl. No.: 332,693

[22] Filed: Dec. 21, 1981

[51] Int. Cl.³ ............................................. F01D 25/24
[52] U.S. Cl. ......................................... 415/9; 415/119; 415/121 G; 415/197; 415/219 R; 416/190; 242/75.3; 138/110; 181/204; 181/213; 181/222
[58] Field of Search .............. 415/9, 119, 197, 219 R, 415/121 G, 108, 128; 416/230, 218, 190, 192; 156/172, 184, 185, 189, 191, 162; 403/43–46, 344; 242/77.3, 117, 75.3, 75.4; 138/148, 113, 114, 99, 110; 181/400, 401, 114, 204, 207, 183, 214, 213, 222, 224; 220/414, 441; 24/265 R, 134 N, 136 R, 132 W, 133

[56] References Cited

U.S. PATENT DOCUMENTS

| | | | |
|---|---|---|---|
| 2,988,302 | 6/1961 | Smith | 415/119 |
| 2,999,667 | 9/1961 | Morley | 415/196 |
| 3,481,427 | 11/1968 | Dobbs et al. | 415/119 |
| 3,542,152 | 11/1970 | Adamson | 415/119 |
| 3,602,602 | 8/1971 | Motta | 415/9 |
| 3,684,205 | 8/1972 | Rogow | 242/75.3 |
| 3,687,222 | 8/1972 | Cambouliues et al. | 415/119 |
| 3,692,251 | 9/1972 | Melead | 242/75.3 |
| 3,739,731 | 6/1973 | Tabor | 220/414 |
| 3,794,708 | 2/1974 | Richards et al. | 156/189 |

FOREIGN PATENT DOCUMENTS

| | | | |
|---|---|---|---|
| 27756 | 4/1981 | France | 415/9 |
| 907562 | 10/1962 | United Kingdom . | |
| 1453873 | 10/1976 | United Kingdom . | |
| 1485032 | 9/1977 | United Kingdom . | |
| 2037900 | 7/1980 | United Kingdom | 415/219 R |

*Primary Examiner*—Stephen Marcus
*Assistant Examiner*—Brian J. Bowman
*Attorney, Agent, or Firm*—Gene D. Fleischhauer

[57] ABSTRACT

A circumferentially extending structure 30 for containing particles having an axial component and a radial component of velocity is disclosed. The apparatus is comprised of a hollow annular beam 48 and a fabric 46 wrapped under tension about the annular beam such that the installed length of the fabric is greater than the free length of the fabric. In one particular embodiment the fabric is coated with a layer 116 of epoxy resin such that the resin penetrates only the top layer of the fabric to form a shield. The shield layer protects the containment fabric from injury.

9 Claims, 18 Drawing Figures

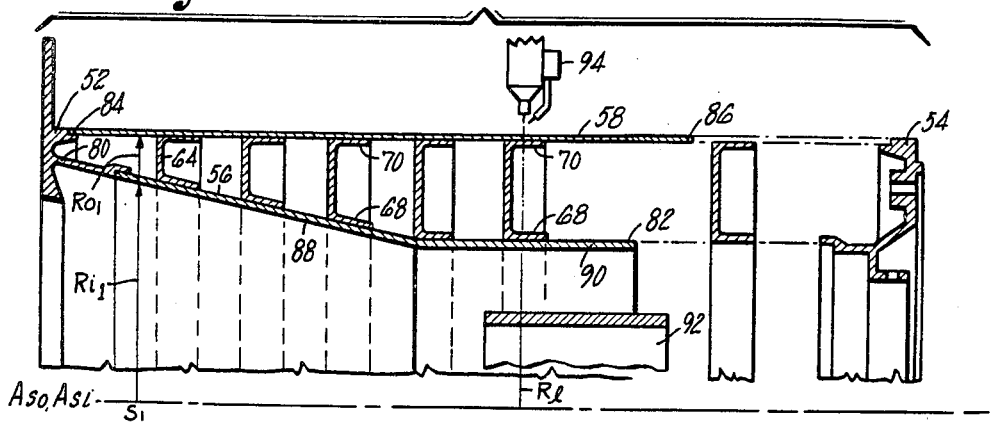
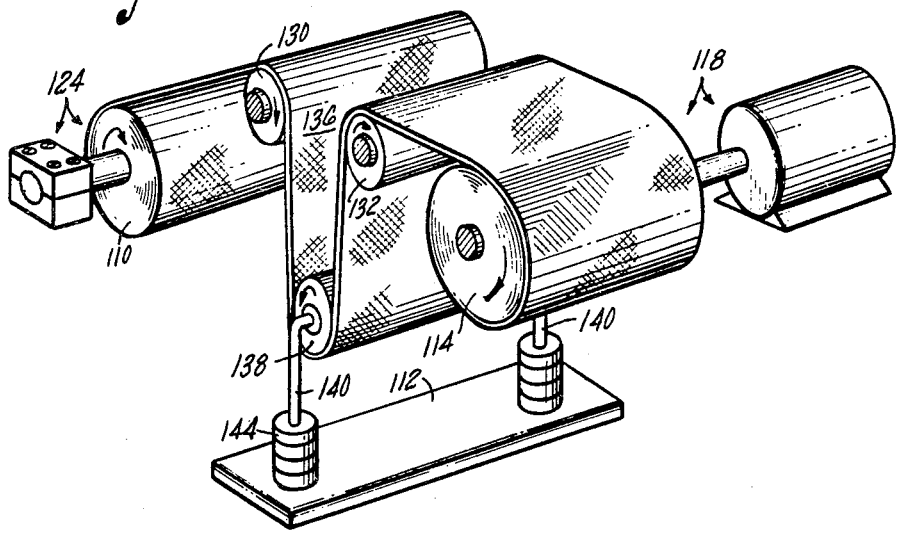
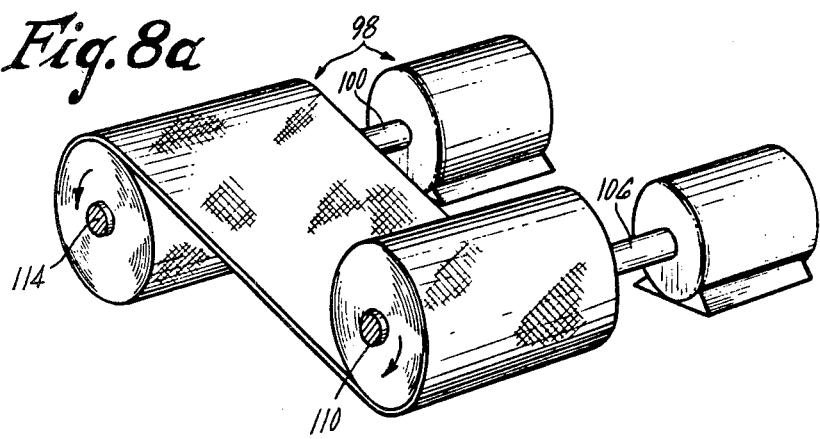

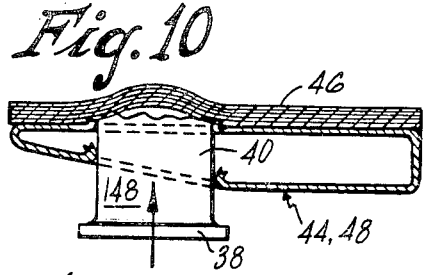
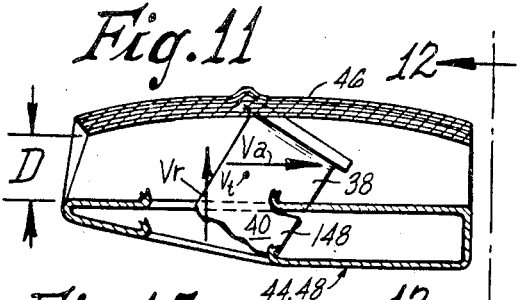
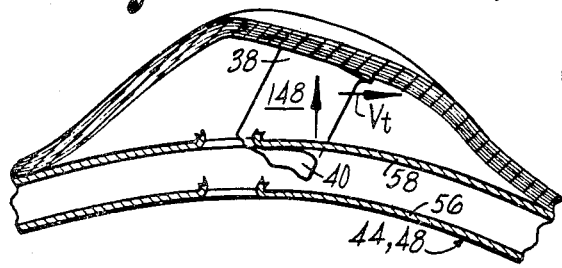
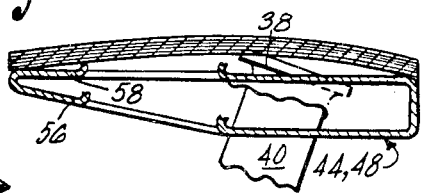
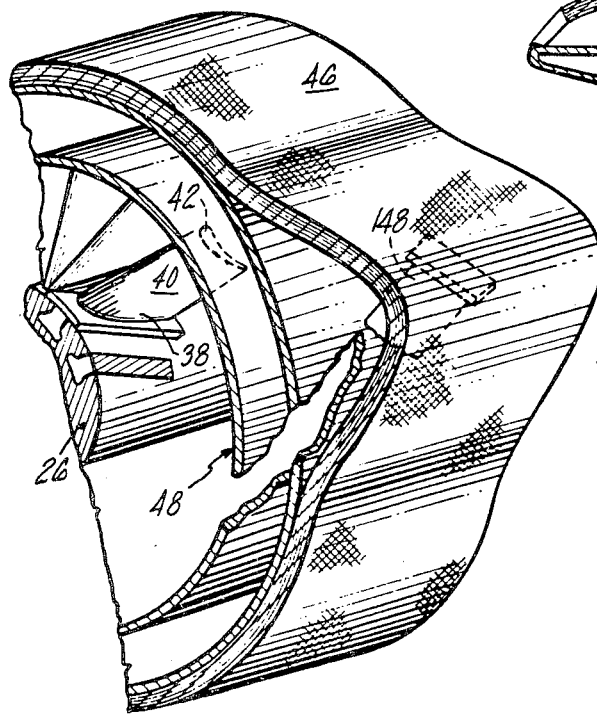
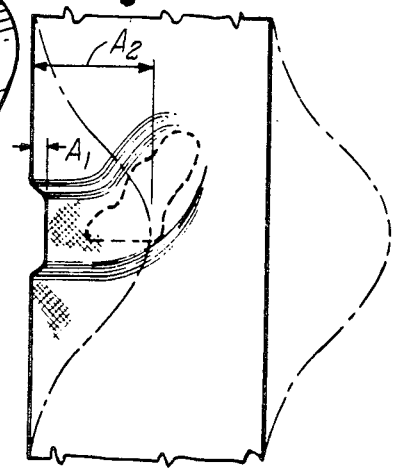

CONTAINMENT STRUCTURE

DESCRIPTION

1. Technical Field

This invention relates to a circumferentially extending structure for containing particles having an axial component of velocity and a radial component of velocity. The invention has particular application to the field of axial flow rotary machines and to the containment of particles resulting from the separation of a rotor blade from a rotating assembly in such a machine but is not limited to the field of axial flow rotary machines.

2. Background Art

In axial flow rotary machines, rotor assemblies are driven at high rotational speeds about an axis of rotation. The rotor assemblies include rotor disks and rotor blades. Foreign objects, such as birds, hailstones or other objects, which on occasion are ingested into the engine, may strike the blades causing parts of the rotor assembly to fragment or to separate from the rotor disk. During such a failure pieces of the rotor assembly may be hurled outwardly from the rotor assembly with velocities of several hundred feet per second. Such velocities typically have components in the axial, tangential and radial directions. One device for containing such fragments is shown in British Pat. Specification No. 1,245,415 issued to Mottram et al entitled "Improvements in or Relating to Fluid Flow Machines." Mottram shows a containment structure formed of two similar metal strip members wound together to form a helical shield. The shield is wound about a solid casing. U.S. Pat. No. 2,999,667 entitled "Protective Arrangement for Use with Apparatus or Machines Having Rotating Parts" issued to Morley shows a containment structure formed of a web of interwoven wires which are continuous from one end of the web to the other. The web is supported in coil form in a first casing between an inner wall and a slidable outer wall. A second casing is spaced radially inwardly from the first casing and extends circumferentially about an array of rotor blades.

Several patents show containment structures formed from synthetic fibers which are woven into a fabric or webbing. U.S. Pat. No. 4,057,359 entitled "Ballistic Nylon Fabric Turbine Governor Housing Shielding Means" issued to Grooman shows a flexible housing cover formed by stitching together two sections of a ballistic nylon fabric. The cover fits over the housing and is held in place by a removable band. Grooman mentions nylon, an aliphatic polyamide fiber, and Kevlar 49, an aromatic polyamide fiber available from the DuPont Corporation, as fibers which are suitable for forming the fabric. U.S. Pat. No. 3,602,602 issued to Motta entitled "Burst Containment Means" shows a containment means formed of a winding of tape over a machinery housing and aligned with the expected path of travel of part fragments to contain the part fragments during a failure of the rotary machine. The cross-sectional view shows a solid housing. No means are provided for bonding or fastening the adjacent turns of the winding to each other or to the housing about which the tape is wound. The winding of tape is formed of ballistic nylon material rather than of an aromatic polyamide fiber fabric such as a Kevlar fabric. Use of a Kevlar fabric restrained in the fore and aft direction along the edges by a shell is a contemporaneous recommendation for a containment structure made in a NASA Final Report entitled "Development of Advanced Lighweight Containment Systems." This report was made under NASA Contract No. NAS3-21823. As shown in the report Kevlar felt is trapped radially between the Kevlar fabric and a honeycomb backed steel shell.

In spite of this progress in containment structures, scientists and engineers are seeking to develop containment means which are light in weight, which are damped against vibrations, and which provide containment of particles such that the particles do not escape from the nacelle surrounding the engine even though the particles have substantial axial, tangential and radial velocities.

DISCLOSURE OF INVENTION

According to the present invention, a structure for containing particles includes a hollow annular beam wrapped with a fabric under tension such that the installed length of the fabric is greater than the free length of the fabric.

In accordance with the present invention, the hollow annular beam has a plurality of annular plates extending circumferentially about the interior of the beam for stiffening the beam and for transmitting vibrations from an inner wall to an outer wall in contact with the tensioned fabric enabling the tensioned fabric to damp vibrations in the beam.

A primary feature of the present invention is a hollow annular beam wrapped with a fabric. The fabric is under tension in the installed condition. The installed length of the fabric is greater than the free length of the fabric. The annular beam has an outer wall abutting the fabric and an inner wall spaced radially from the wall. A plurality of annular plates extend between the outer wall and the inner wall. In one embodiment at least two of the annular plates have C-shaped cross-sections. Each C-shaped cross-section is formed of a radially extending rib and two axially oriented legs each attached to an associated wall of the annular beam. In another embodiment, an end of the fabric is secured to the outer wall of the annular beam. The other end of the fabric is secured to the exterior of the fabric. In an embodiment, the installed length of the fabric is five percent (5%) greater than the free length of the fabric. In one detailed embodiment, a coat of epoxy resin is applied to the exterior surface of the fabric after the wrapping is completed.

A primary advantage of the present invention is the containment of projectiles within the nacelle surrounding the engine during a blade failure of the rotary machine which results from the ability of the fabric to absorb the impact energy of the projectile. Another advantage is the ability of the containment structure to block the escape of secondary fragments which might otherwise pass through holes in the hollow annular beam formed during the passage of large fragments through the beam by minimizing the shifting or folding of the fabric away from such holes. An advantage of the present invention is the capability of the beam to permit large blade fragments to pass through the annular beam and to maintain structural integrity after such penetration. Another advantage is the low cycle fatigue life of the hollow annular beam which results from the damping of vibrations in the annular beam by the tensioned fabric. Another advantage is the smaller radial profile of the nacelle which results from decreasing the radial deflection of the fabric during the impact of a particle as compared with structures using untensioned fabric. Still another advantage is the avoidance of the escape of large particles between the edge of the fabric and the support structure.

Other features and advantages will be apparent from the specification and claims and from the accompanying drawings which illustrate an embodiment of the invention.

BRIEF DESCRIPTION OF DRAWINGS

FIG. 7 is an exploded schematic illustration of the support structure shown in FIG. 2 illustrating the method of assembling the support structure;

FIG. 8a is a schematic illustration of an apparatus for wrapping fabric under tension during the transfer of fabric from one reel of fabric to another;

FIG. 9a is a schematic illustration of an alternate embodiment of the apparatus shown in FIG. 8a;

FIG. 10 is a schematic representation of a portion of a blade moving outwardly, piercing the rub strip and support structure;

FIG. 11 is a schematic representation of a portion of a blade that has penetrated the support structure and deflected the fabric wrapping;

FIG. 12 is a side elevation view taken along the lines 12—12 of FIG. 11;

FIG. 12a is a perspective view of the rotor assembly, the blade fragment of the rotor assembly, the support structure and the fabric, partly in section and partly broken away;

FIG. 13 is a schematic representation corresponding to FIG. 10 of the portion of the blade after the blade has moved axially with respect to the point of penetration of the support structure;

FIG. 14 is a schematic representation of the blade fragment trapped between the support structure and circumferentially extending fabric;

FIG. 15 is a plan top view along the lines 15—15 of FIG. 13.

BEST MODE FOR CARRYING OUT THE INVENTION

Figure 1:
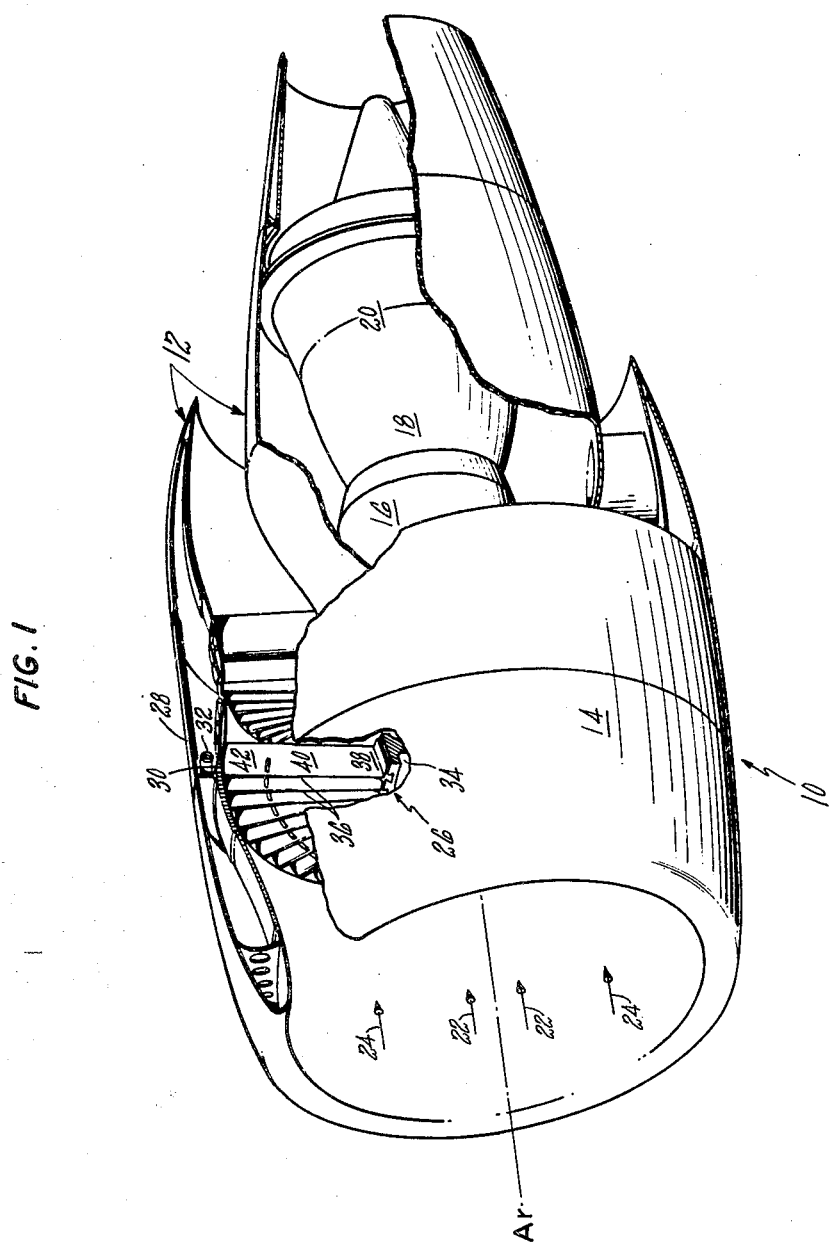
FIG. 1 is a perspective view of an axial flow gas turbine engine mounted in an aircraft nacelle with a portion of the nacelle and the engine broken away to show an array of rotor blades and the adjacent fan case structure in the engine.

A gas turbine engine 10 of the axial flow, turbofan type is shown in FIG. 1. The engine has an axis of rotation $A_r$. A nacelle 12 circumscribes the engine and is adapted to both support and position the engine from a support structure such as an aircraft wing (not shown). The engine is formed of a fan section 14, a compressor section 16, a combustion section 18 and a turbine section 20. A primary flow path 22 for working medium gases is annular and extends rearwardly through these sections. A secondary flow path 24 for working medium gases is annular and extends rearwardly outwardly of the primary flow path.

The fan section 14 includes a rotor assembly 26 having an axis of rotation $A_r$ and a stator assembly 28. The stator assembly has an axially extending fan case 30 which forms an inner wall of the nacelle 12. Service components such as a duct 32 for anti-icing air and a starter (not shown) for starting the aircraft with compressed air are disposed radially outwardly of the fan case. The rotor assembly includes a rotor disk 34 and a plurality of rotor blades 36. Each rotor blade has a root region 38, a midspan region 40 and a tip region 42. The rotor blades extend outwardly from the disk across the working medium flow paths into proximity with the stator assembly.

Figure 2:
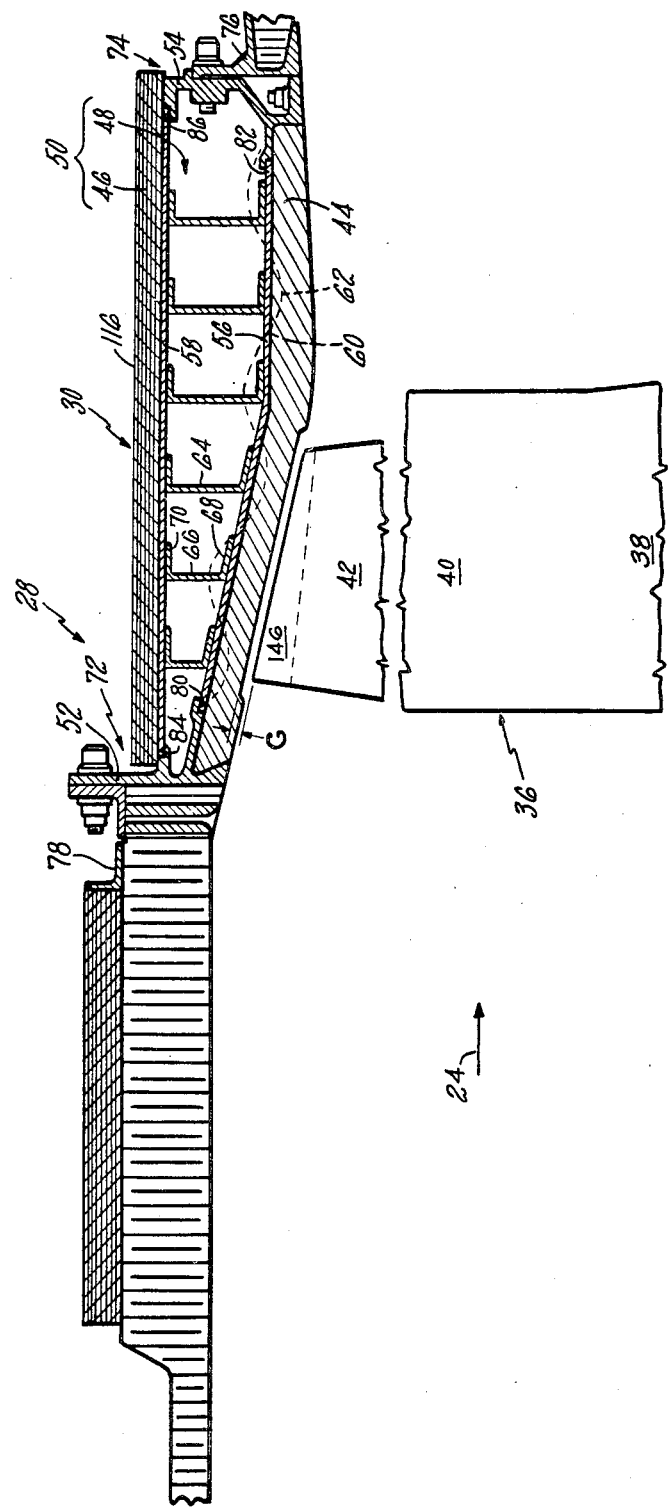
FIG. 2 is a cross-sectional view of the fan case structure adjacent the rotor blade and is a side elevation view of the rotor blade with portions of the rotor blade broken away.

FIG. 2 is an enlarged cross-sectional view of the stator assembly 28 and shows the fan case 30 and one of the rotor blades 36 with portions of the rotor blade broken away. Each rotor blade is spaced radially from the fan case leaving a gap G therebetween. The fan case outwardly of the rotor blade is formed of a rub strip 44, a fabric 46 and a structure 48 for supporting the rub strip and the fabric such as an annular beam. The annular beam has an axis of symmetry $A_s$. The annular beam 48 and the fabric 46 form a circumferentially extending structure 50 for containing particles having an axial component of velocity and a radial component of velocity. Such a structure is often referred to as a "containment case".

The fabric 46 extends circumferentially about the annular beam 48 under tension such that the installed length of the fabric is greater than the free length of the fabric. The term "fabric" includes, but is not limited to, tape, woven material or the like and may be formed of organic or inorganic material. One satisfactory fabric is formed from a yarn made of aromatic polyamide fibers such as Kevlar 29. (Kevlar is a registered trademark of the DuPont Corporation). The yarn has a fineness of fifteen hundred (1500) deniers. The yarn is woven with a twenty-four (24) strand by twenty-four (24) strand basket weave pattern into a fabric having selvaged edges. A satisfactory fabric having selvaged edges is available as Style 120 Kevlar Fabric from Fabric Development, Incorporated, Quakertown, Penna.

Figure 3:
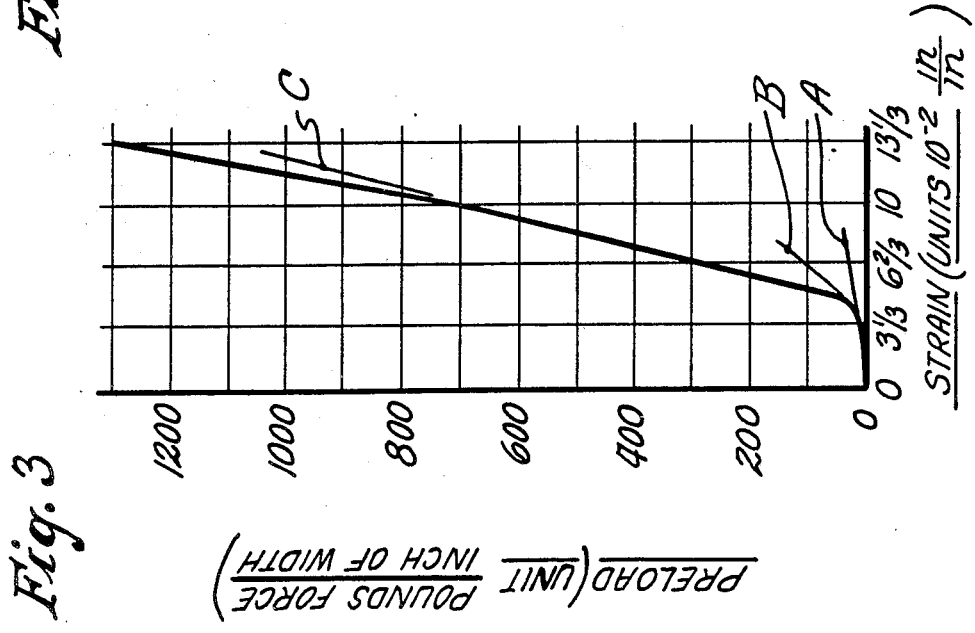
FIG. 3 is a graphical representation of the axial force required to cause an incremental increase in the length of a fabric.

FIG. 3 is a graphical representation of the elongation per length of woven Kevlar 29 fabric resulting from a force acting in the direction of elongation. The vertical axis of the graph is the total force applied to the fabric divided by the width of the fabric in inches. The horizontal axis is the quantity resulting from dividing the total elongation resulting from the application of the force by the free length of the fabric before elongation. The slope of the curve at any point along the curve is a constant of proportionality between the force per unit of width, and the elongation per unit of length of the fabric. The constant of proportionality is often called the force constant, or the stiffness coefficient or the spring constant of the fabric. Thus, the spring constant is defined as the ratio of the force per unit of elongation and may be expressed in pounds force per inch (lbf/in.), or newtons per meter, or in dynes per centimeter. The line A, the line B and the line C shown in FIG. 3 approximate three spring force constants of the fabric which are nearly linear over a range of deflection.

Figure 4:
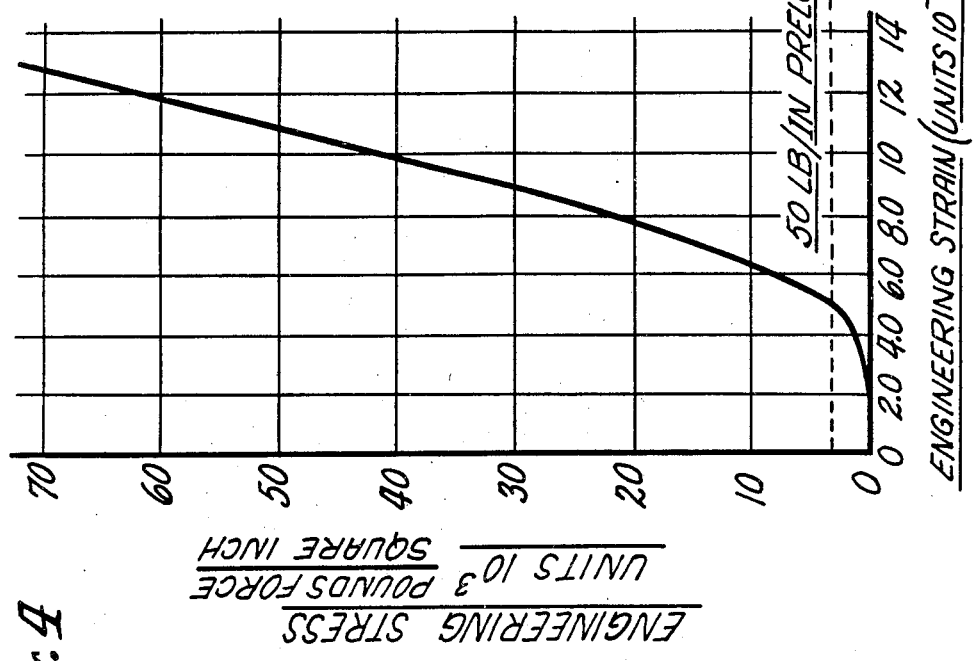
FIG. 4 is a graphical representation of the engineering stress occurring in the fabric versus the engineering strain in the fabric.

FIG. 4 is a graphical representation of engineering stress in the fabric versus the engineering strain of the fabric. The area under the curve is a measure of the amount of work per unit volume of the fabric which may be done on the fabric without causing it to rupture, neglecting frictional forces and adiabatic heating of the fabric.

Figure 5:
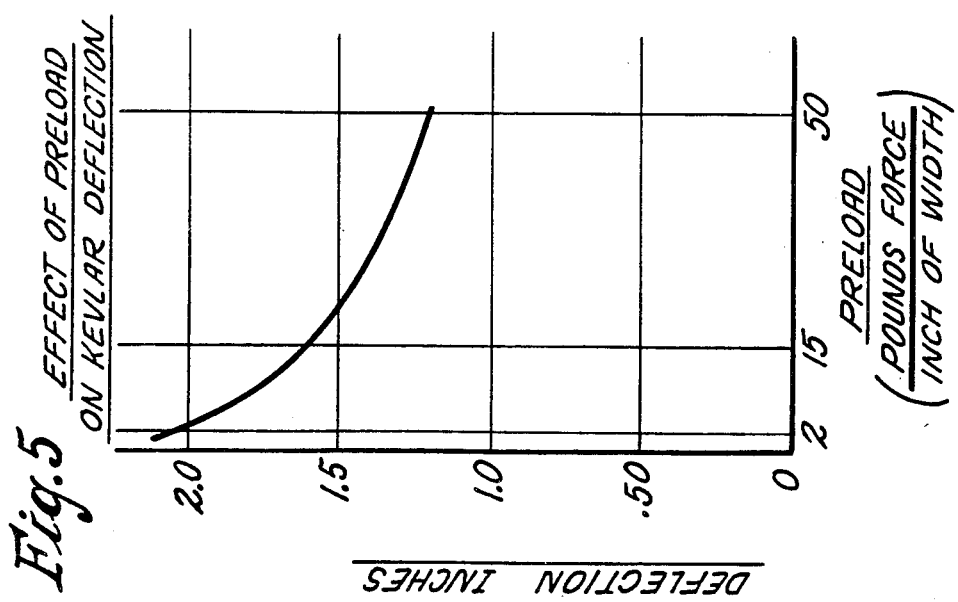
FIG. 5 is a graphical representation of the deflection of the fabric resulting from an impact against the fabric by a projectile having only radial velocity as a function of preload on the fabric in the installed condition.

FIG. 5 is a graphical representation of the deflection of the fabric resulting from an impact against the fabric by a projectile having only radial velocity as a function of preload on the fabric in the installed condition. Fifteen wraps of the woven Kevlar 29 fabric extending circumferentially about a twenty-inch diameter support structure were struck by a one-hundred and ten grain projectile. Testing demonstrated that as the preload on the fabric (and thus the tension) was increased, the amount of deflection of the fabric was decreased.

Figure 6:
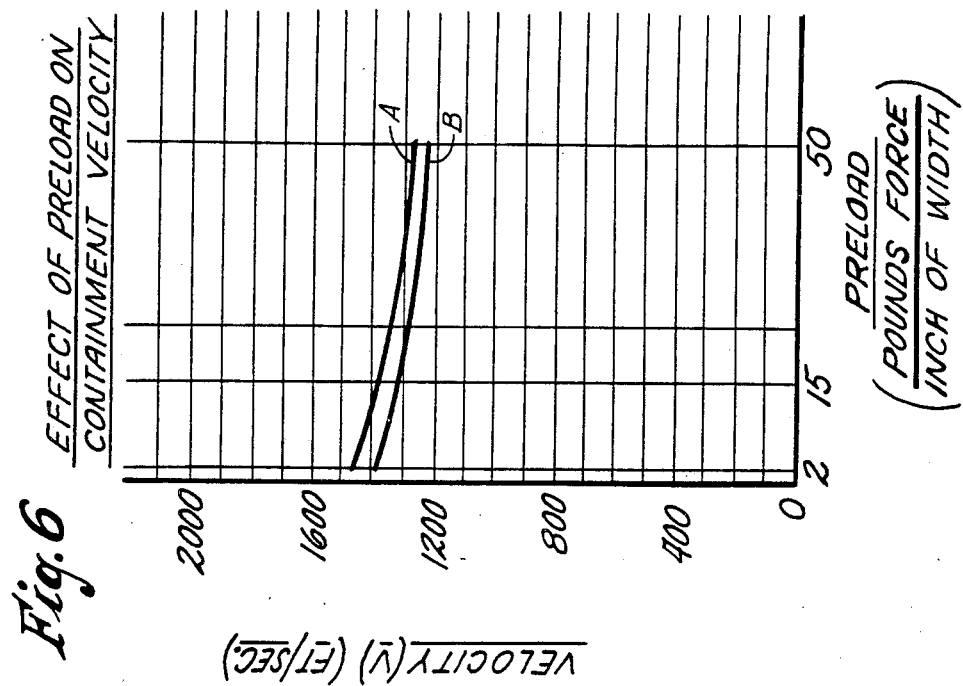
FIG. 6 is a graphical representation of the capability of the preloaded fabric to contain a projectile having only radial velocity as a function of the velocity of the projectile.

FIG. 6 is a graphical representation of the capability of the preloaded wraps of fabric to contain a one-hundred and ten grain projectile. The velocity of projectiles contained and not contained is plotted as a function of the preload (and thus the tension) on the fabric in the installed condition. As with FIG. 5, the projectile was impacted against fifteen wraps of fabric extending circumferentially about a twenty inch diameter support structure. Increased preloads on the fabric decreased the velocity at which the projectile was contained. Curve A is the lowest velocity of projectiles not contained. Curve B is the highest velocity of projectiles contained.

As shown in FIG. 2, the support structure such as the annular beam 48 is a hollow beam. The annular beam includes a first flange such as the upstream flange 52, a second flange such as the downstream flange 54, a first wall such as the inner wall 56, and a second wall such as the outer wall 58. The outer wall is thinner than the inner wall. Both walls are designed to be penetrated by a fragment comprised of the root-midspan portion of the blade. The flanges are annular plates extending circumferentially about the axis of symmetry $A_s$. The annular beam 48 has a characteristic vibratory pattern at the inner wall 56, as shown by the broken line, which includes spaced apart nodes 60 and antinodes 62. A plurality of annular plates 64 having a C-shaped cross section, extend between the outer wall and the inner wall of the hollow beam. Each annular plate is rigidly attached to the inner wall at an antinode.

Each of the C-shaped annular plates has a rib 66 extending radially between the walls. Extending from the ribs are a first leg such as inner leg 68 and a second leg such as outer leg 70. The inner leg is spaced radially from the outer leg and radially faces the outer leg such that a radial line perpendicular to the axis of symmetry of the stiffener passes through both legs. The legs 68 and 70 extend in an axially oriented direction away from the first flange toward the second flange. The legs adapt the stiffeners to engage the walls and are in abutting contact with the walls. The inner leg or the outer leg may have a cylindrical or a frustoconical shape to conform to the shape of the abutting wall.

The hollow, annular beam 48 has a first end, such as the upstream end 72, and a second end spaced axially from the first end, such as the downstream end 74. A first structure 76 is axially adjacent to the annular beam at the upstream end of the beam. A second structure 78 is axially adjacent to the annular beam at the downstream end of the beam. The first upstream flange 52 adapts the beam to support the axially adjacent first structure. The second downstream flange 54 adapts the beam to be supported by the axially adjacent second structure. The inner wall 56 of the beam has a first edge, such as upstream edge 80, and a second edge such as the downstream edge 82. The upstream edge adapts the wall to be joined to the upstream flange 52, and the downstream edge adapts the wall to be joined to the downstream flange 54. The outer wall has a first edge, such as upstream edge 84, and a second edge, such as the downstream edge 86. The upstream edge adapts the outer wall to be joined to the upstream flange 52 and the downstream edge 86 adapts the wall to be joined to the downstream flange 54.

FIG. 7 is an exploded view of the support structure shown in FIG. 2 and illustrates a method for forming the support structure. The outer wall 58 is formed of two sheets having circumferentially facing ends which are butt welded together to form a first cylindrical hoop and a second cylindrical hoop. The first and second cylindrical hoops are butt welded together to form a single cylindrical wall. The cylindrical wall is the outer wall in the installed condition. The outer wall is circumferentially continuous, has an axis of symmetry $A_{so}$ and is spaced a first distance $Ro_1$ from the axis of symmetry at any section $S_1$ perpendicular to the axis of symmetry. The inner wall 56 is formed of two sheets. Each sheet has circumferentially facing ends which are butt welded together to form either a frustoconical hoop 88 (first sheet) or a cylindrical hoop 90 (second sheet). The hoops are butt welded together to form an inner wall having a frustoconical portion transitioning into a cylindrical portion. The inner wall is circumferentially continuous, has an axis of symmetry $A_{si}$ and is spaced a second distance $Ri_1$ from the axis of symmetry at the section $S_1$. The second distance $Ri_1$ is smaller than the first distance $Ro_1$ ($Ri_1 < Roi_1$).

The inner wall 56 is disposed axially and radially with respect to the outer wall 58, such that the outer wall is axially aligned with the inner wall and is spaced radially from the inner wall leaving a gap therebetween. The inner wall and the outer wall are located with respect to each other and the annular plate by attaching an endmost C-shaped annular plate 64 to the walls. As shown, the endmost annular plate is the annular plate nearest the edges of the walls (upstream edges 80, 84). The annular plate is oriented to face the legs toward (downstream edges 82, 86) of the walls. One satisfactory method of attaching the annular plate to the walls is by resistance spot welding the walls to the legs 68, 70 of the annular plate. The spot welds are circumferentially spaced and place each leg in abutting contact with the wall. The spot welds locate the walls with respect to the annular plate during the assembly procedure and are not intended to permanently join the annular plate to the walls. After spot welding the first C-shaped annular plate to the inner wall 56 and the outer wall 58, the adjacent C-shaped plate is slid past the downstream edges 82, 86 of the walls into position between the walls. Because the inner leg 68 of the plate has the same frustoconical shape as the frustoconical portion of the inner wall, the stiffener locates itself axially with respect to the inner wall. The second C-shaped plate is attached to the walls, such as by resistance spot welding, to locate the second annular plate during the assembly procedure. In a like manner, the remaining plates are assembled to the walls. A distinct and particular advantage of this assembly procedure is the orientation of the legs during assembly which enables the inspection of each resistance spot weld as each C-shaped annular plate is inserted and spot welded. The inspection insures that the legs of the stiffener are in abutting contact with the inner wall and outer wall.

The subassembly comprising the inner wall 56, the outer wall 58 and the C-shaped annular plates 64 is mounted on a second fixture to ensure that the annular beam has a proper concentricity and diameter. The fixtured subassembly is mounted in a welding chamber such as an electron beam weld chamber. A welding shield 92 is mounted inwardly of the inner sheet. A device for forming a beam of directed electromagnetic or electronic energy such as an electron beam welder 94 is positioned radially outwardly of the outer wall and is aligned with the legs 68, 70 of a C-shaped annular plate to pass the stream of energy on a radial line $R_l$ through both the inner leg 68 and the outer leg 70. The case is rotated in alignment with the beam of energy. The electron beam passes through the outer wall, the outer leg, the inner leg, and the inner wall and impinges on the shield. The electron beam causes fusion to occur between the legs of the plate and the inner and outer wall, permanently joining the C-shaped plate to the inner and outer walls. In a like manner the remaining C-shaped walls are joined to the inner and outer walls. The interior of the inner wall is inspected for evidence of welding to insure that the electron beam has gone all the way through to the interior of the case. The inspection establishes that a weld exists between the inner wall and and the inner leg and between the outer wall and the outer leg. After the inspection, the upstream flange 52 and the downstream flange 54 are fusion welded to the sheets with a heliarc welding process.

In an alternate method, the endmost annular plate which locates the inner wall 56 and the outer wall 58 is permanently joined to the walls before the insertion of the adjacent plate. A continuous weld is formed between the plate and the walls by welding the components with a suitable welder such as an arc welder, a resistance welder, an oxyacetylene welder or an electron beam welder. The step of joining the annular plate to the walls which is performed immediately after the step of inserting the annular plate in the alternate method, includes joining the outer leg to the outer wall and the inner leg to the inner wall. Each of the remaining annular plates is oriented to face the legs in the same axial direction as the first plate. Each annular plate that is inserted is joined to the inner wall and the outer wall before the insertion of any remaining annular plates. Because of the orientation of the legs 68, 70 both welds may be made simultaneously with a welder such as a resistance welder. After welding of the plate, both welds may be inspected.

Figure 8:
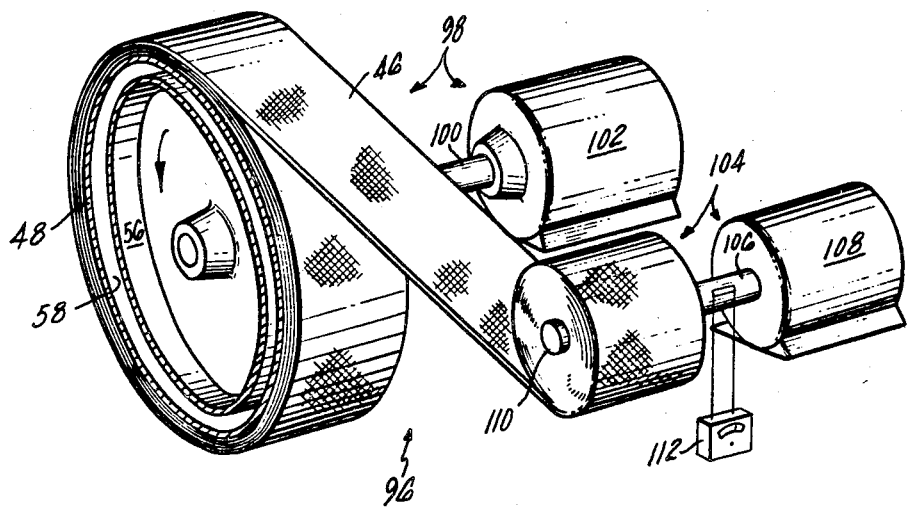
FIG. 8 is a schematic illustration of an apparatus for wrapping fabric under tension about the support structure.

FIG. 8 shows a machine 96 for wrapping the fabric 46 about the annular beam 48. The machine includes a first apparatus 98 for applying the fabric to the annular beam. The first apparatus has a shaft 100 and a means 102 for rotating the shaft. The annular beam 48 is mounted on the shaft. A second apparatus 104 for feeding the fabric has a shaft 106 and a means 108 for rotating the shaft. A reel 110 is mounted on the shaft 106. Fabric is wrapped about the reel with a preload that is less than the preload on the fabric in the installed condition. A strain gauge 112 on the shaft 106 measures the torque being applied to the shaft. The preload and the resulting tension in the fabric are easily determined from the torque in the shaft. The fabric is fed under tension from the reel by rotating the reel through an angle to unwind a first length of the fabric from the reel. A preload (and the associated tension) is applied to the fabric by rotating the annular beam 48 mounted on the shaft through an angle to wind a second length of fabric onto the structure which is greater than the first length of the fabric. By causing an elongation of a known amount in the length of the fabric, the tension in the fabric resists subsequent deflections of the fabric under the impact of a particle with a spring constant of the fabric which is greater than the first spring constant. For example, this greater spring constant may approximate the third spring constant of the fabric as shown by the line C of FIG. 3. The third spring constant results from applying a tension to the fabric in the installed condition which is equal to the tension that results from applying a uniform load lying in range of forty-five to fifty-five pounds of force per inch of axial width of fabric wherein the load is distributed uniformly over the width of the fabric, and acts tangentially to the fabric on the minimum cross-sectional area presented by the fabric to the load. For example, such a tension is achieved in a fabric having a width of eleven inches by applying a uniform load of five hundred and fifty (550) pounds of force plus or minus fifty-five ($\pm 55$) pounds to the fabric. Alternatively, the greater spring constant chosen may approximate the second spring constant of the fabric as shown by line B of FIG. 3. The second spring constant corresponds to a fabric under a preload which is greater than or equal to ten pounds per inch of axial width.

As shown in FIG. 8a, an alternate method of applying the preload to the fabric uses at least one intermediate reel such as a second reel 114. For example, a second reel 114 empty of fabric may be mounted on the shaft 100 of the first apparatus 98 in place of the annular beam 48. The second reel 114 receives fabric from the first reel 110 at a preload which is less than the preload on the fabric in the installed condition. Wrapping the fabric at a smaller preload than, for example, five hundred and fifty (550) pounds of force facilitates control of the tension in the fabric during the wrapping process and results in increasing the elongation of the fabric an incremental amount which is less than the elongation of the fabric in the installed condition. After wrapping the second reel 114, the second reel may be shifted to the shaft 106 of the second apparatus for feeding the fabric onto a new second reel 114 mounted on the shaft 100 of the first apparatus. This process may be repeated until the fabric is wrapped on a reel 114 at a preload (and under an associated tension) which is equal to the tension in the fabric in the installed condition. The fabric may then be wrapped on the annular beam 48 with no further elongation in the fabric.

Wrapping of the support structure is begun by taping the fabric to the support structure or otherwise holding the fabric in place and hand laying one hundred-eighty degrees (180°) of the first wrap with no load on the fabric (zero tension). The remaining one hundred-eighty degrees of the first wrap is applied and, as this second half of the first wrap is applied, the tension in the fabric is increased by uniformly increasing the load from zero pounds of force (0 lb$_f$) to fifty pounds of force plus or minus five pounds of force per inch of width (50±5 lb$_f$/in) of the fabric. Fabric under such a preload has elongated approximately five percent (5%) of the free length of the fabric. The tension is maintained within these limits and an additional thirty-eight wraps are applied to the case. The last containment wrap (thirty-ninth wrap) is applied over the preceding containment wrap (thirty-eighth wrap). The frictional force between all of the wraps of the fabric is such that leaving the thirty-ninth wrap free would result in a small amount of unwrapping and a relaxation of the tension in only the outermost layers of the fabric. The relaxation in tension in the outermost layer is avoided by securing the fabric against unwrapping. One method of securing the fabric against unwrapping includes the step of restraining a portion of the fabric against movement with respect to a second portion of the fabric such as by bonding a portion of the fabric to a second portion of the fabric. For example, the last containment wrap (thirty-ninth wrap) is secured against unwrapping by bonding the outwardly facing surface of the thirty-eighth wrap to the inwardly facing surface of the thirty-ninth wrap. The bonding is done by applying a rubber-base adhesive to a portion of one of the surfaces, pressing the adhesive-covered surface against the faying surface and restraining the fabric against movement until the adhesive cures. One satisfactory rubber-base adhesive is a silicone rubber compound, such as RTV 159 silicone rubber compound distributed by the General Electric Corporation, Silicone Products Division, Waterford, New York. This particular adhesive is cured at room temperature.

The nacelle 12 shields the exterior of the fabric 46 from damage in the installed condition. An additional wrap (fortieth wrap) is applied in tension over the preceding wrap (thirty-ninth wrap). A second shield 116 is provided by applying a coating of epoxy resin to the exterior of the wrapped fabric. The method of forming the shield includes the step of applying a first coating of epoxy resin between the beginning of a forty-first wrap and the beginning of the fortieth wrap and to the outer surface of the wrapped fabric. The epoxy resin has a viscosity during application which is in the range of ten to sixteen Pascal-seconds (10–16 Pa.s). The fabric is held under tension until the epoxy cures. The first coating of epoxy resin does not penetrate to the thirty-ninth wrap because the tension on the fabric causes the strands of the fabric to press tightly one to the other blocking penetration of the fabric by the resin. The high viscosity of the epoxy resin of the first coating retards the penetration of the resin into the fabric as the resin cures. Moreover, as the epoxy resin cures, the resin generates heat, which increases the rate at which the resin cures. The method of forming a shield includes the additional step of applying a second coating of epoxy resin to the first coating of epoxy resin, the second coating having a second viscosity during application in the range of five-tenths to seven-tenths Pascal-seconds (0.5–0.7 Pa.s). The second coating of epoxy resin cannot penetrate the first coating of epoxy resin because the first coating of epoxy resin has cured and forms a shield against penetration. In addition to applying the epoxy resin to the outer surface of the fabric, the resin may also be applied to the edges of the wrapped fabric. One satisfactory epoxy resin for the first coating is EPON Resin 828 epoxy resin distributed by the Shell Chemical Company, a division of Shell Oil Company, Houston, Texas. One satisfactory epoxy resin for second coating is EPON Resin 815 or 8132 epoxy resin which is available from the Shell Chemical Company. A satisfactory curing agent for the three resins from the Shell Chemical Company is EPON U Curing Agent which is available from the Shell Chemical Company.

Figure 9:
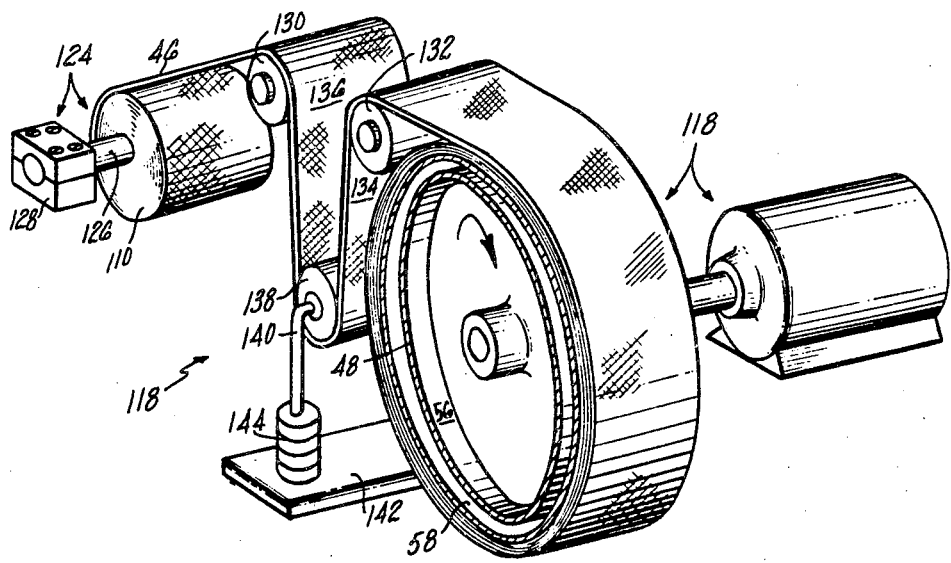
FIG. 9 is a schematic illustration of an alternate embodiment of the apparatus shown in FIG. 8 and is an embodiment utilizing a suspended weight to preload the fabric.

FIG. 9 shows an alternate embodiment 118 of a machine 96 for wrapping the fabric 46 about the annular beam 48. The machine includes a first apparatus 118 for applying the fabric to the annular beam. The first apparatus includes a shaft 120 and a means 122 for rotating the shaft. A second apparatus 124 for feeding the fabric includes a shaft 126 and a means 128 for rotating the shaft an incremental amount. The reel 110 of fabric 46 is attached to the shaft 126. A first roller 130 and a second roller 132 guide the fabric and are attached to a suitable support (not shown). The fabric has an inwardly facing surface 134 and an outwardly facing surface 136.

A third roller 138 rotatably engages the outwardly facing surface 136 of the fabric 46. Two elements, as represented by the bar 140, extend downwardly from the third roller. A shelf 142 is attached to the bars. A weight 144 is placed on the shelf to load the roller and through the roller to provide a preload to the fabric. During the step of wrapping the fabric about the annular beam of the fan case 30 the fabric is fed from the first reel 110 and is taken up by the annular beam 48. The shelf which is suspended by the third roller from the fabric exerts a predetermined downward force on the fabric even though the height of the roller above a reference plane may vary as the fabric moves through the third roller. The method of wrapping the support structure otherwise proceeds in an identical fashion to the method of wrapping the support structure with the machine 96.

FIG. 9a illustrates an alternate method of applying the preload to the fabric using at least one intermediate reel 114 and the apparatus 118 shown in FIG. 9.

During operation of the engine, the rotor assembly 26 shown in FIG. 1 rotates about the axis of rotation $A_r$ at speeds as high as four thousand revolutions per minute.

Vibrations are induced in the inner wall by the rotor blades passing in close proximity to the inner wall as the blades rotate about the annular flowpaths 22, 24. Mechanical vibrations are transmitted to the annular beam from the adjacent structures 76, 78. The mechanical vibrations and the induced vibrations are transmitted via the annular plates 64 to the outer wall 58 of the annular beam. The wraps of elastic Kevlar fabric 46, which press tightly against the outer wall and each other because of tension in the fabric, are free to move imperceptibly with respect to each other. In response to movement of the outer wall, the wraps of fabric move inperceptibly dissipating a portion of the vibrational energy as heat and converting a portion of the vibrational energy through deflection into elastic strain energy. The dissipation of vibrational energy and heat and the conversion of vibrational energy into elastic strain energy damps vibrations in the annular beam.

As the rotor assembly rotates, the disk 34 exerts a centripetal force on the root region 38 causing the blade to follow a circular path about the axis of rotation $A_r$ of the rotor assembly. An impact on the blade by a foreign object may cause the blade to fail in the root region.

The following description is illustrative of a typical interaction between the blade, the support structure and the fabric. The description is by no means an exhaustive description of all possible interactions between the components during a blade failure. Upon failure, the blade moves radially outwardly across the gap G (between the tip region 42 and the rub strip 44) strikes the rub strip and fragments. Typically, the tip region of the blade breaks off from the rotor blade leaving behind the root region 38 and midspan region 40 of the blade. The fragments 146 of the tip region move forwardly with a relatively high axial velocity because of the shape of the flow path and because of the difference in pressure which exists between the leading edge and the trailing edge of the blade. The midspan and base region of the blade form a second portion 148 of the blade which moves radially outwardly across the radial distance occupied by the tip region and across the gap G to strike the rub strip. The second portion of the blade is of larger size and has more energy than the tip region particle of the blade and is stronger than the tip region of the blade.

As shown in the FIG. 10 schematic representation, the energy and strength of the second portion 148 of the blade enables the second portion 148 of the blade to penetrate the rub strip 44 and the annular beam 48 without shattering the blade portion and to strike the Kevlar fabric 46. The Kevlar fabric restrains the outward movement of the second portion of the blade and decreases the outward velocity of the blade.

As the second portion 148 of the blade moves outwardly, the second portion of the blade is struck from behind by the adjacent (following) blade. The following blade turns the root region 38 of the blade outwardly and the midspan region 40 inwardly and drives the second portion of the blade around the circumference of the support structure, slashing a hole in the support structure. The second portion of the blade has an axial rearward component of velocity $V_a$ as a result of being struck by the following blade and because of this contact and the rotational energy of the blade, the second portion of the blade has also a radial outward component of velocity $V_r$ and a tangential component of velocity $V_t$ in a circumferential direction. The second portion of the blade is of larger size than the tip region particle 146 and is stronger than the tip region 42 of the blade enabling the second portion of the blade to penetrate the rub strip and the annular beam without shattering.

The hollow annular beam 48 is dimensioned such that the second portion 148 of the blade penetrates through the inner wall 56 and the outer wall 58. The hollow beam accepts the penetration of the second portion of the blade enabling the blade fragment to reach the fabric and positions the fabric to receive the impact of the blade, permitting the fabric to perform the containment function. As the blade fragment passes through the inner wall and the outer wall, the blade exerts local shearing forces on the inner wall and the outer wall which are transmitted to the flanges through the walls and the annular plates 64 which tie the plates together.

FIG. 11 is a schematic representation of the second portion 148 of the blade after the second portion was struck by the following blade as the portion of the blade moves outwardly with the velocity components $V_a$, $V_r$ and $V_t$, further piercing the rub strip 44 and the support structure 46.

A particular advantage of the present invention is the capability of the annular beam 48 to accept the penetration of both walls by the second portion of the blade and yet to maintain its stiffness and its ability to position the fabric about the engine which results from the configuration of the beam. As the second blade portion penetrates the hollow beam it may locally destroy a portion of the annular plates which extend circumferentially about the interior of the hollow beam. The adjacent plates and the portions of the injured plate adjacent to the area of injury provide the necessary stiffness to support the fabric in its correct position. The weight of the beam is low as compared with solid beams of equivalent stiffness by reason of the radial height of the annular beam. The radial height displaces a substantial portion of the mass of the hollow beam from the neutral axis of the beam increasing the moment of inertia of the beam about the neutral axis and thus the radial stiffness of the beam as compared with a solid beam. Thus the case maintains required radial stiffness and axial stiffness to position the fabric and rub strip and yet accepts penetrations by such large fragments.

As shown in the FIG. 11 schematic representation, the second portion of the blade 148 has penetrated through the annular beam and has impacted against the fabric 46 causing the fabric to deflect outwardly away from the case. During assembly of the containment structure, the amount of work absorbed per unit of elongation of the fabric was increased with respect to untensioned Kevlar fabric by preloading the fabric. As a result of the preload, the deflection of the fabric away from the annular beam per unit of energy absorbed is decreased as compared with loosely wrapped fabric.

Experiments on ballistic models indicate that a Kevlar fabric wrap under no tension when hit by a given fragment will deflect a distance D of seven and one-half (7.5 in.) away from an annular beam 48 having a diameter of eighty (80) inches. These experiments indicate that preloading the Kevlar fabric with a preload of fifty pounds force plus or minus five pounds of force ($50\pm5$ lb$_f$) per inch of axial width, will decrease the deflection D of the Kevlar from seven and one-half inches (7.5 in.) to three and one-half inches (3.5 in.).

FIG. 12 is a side elevation view taken along the lines 12—12 of the schematic representation shown in FIG. 11. FIG. 12a is a perspective view of the rotor assembly 26, the blade portion 148, the annular beam 48 and the fabric 46. As the second portion of the blade strikes the fabric and causes the fabric to deflect, a passageway 150 opens for the blade in the axial direction. As shown in FIG. 3, the preload causes the layers of Kevlar fabric to exert a greater radial force than the force exerted by untensioned Kevlar fabric. The passage closes before the axial component of velocity of the second portion of the blade causes the blade to move out through the passageway and out from under the Kevlar fabric between the edges of the fabric and the case.

As shown in FIG. 13 and FIG. 14, the Kevlar fabric begins to snap back towards the case around the blade fragment trapping the fragment between the support structure and the Kevlar.

As shown in FIG. 15, preload (and the associated tension) in the Kevlar fabric also limits the deflection of the Kevlar fabric in the axial direction causing the Kevlar fabric to move axially rearwardly a small distance $A_1$ as compared with the distance $A_2$ that untensioned Kevlar fabric (shown in dotted line) might move. The small axial deflection of the Kevlar fabric keeps the fabric over the hole through the support structure and avoids exposing the nacelle to additional fan blade particles from other damaged fan blades which might otherwise exit through the support structure and past the moved Kevlar.

The deflection of the fabric 46 shatters the epoxy shield protecting the fabric from the elements. The adhesive bond between the thirty-eighth wrap and the thirty-ninth wrap is not destroyed by the maximum deflection of the fabric because the rubber-base adhesive bond between the last two containment wraps of the fabric flexibly attaches the wraps together. The fabric does not unwrap and no loss of tension occurs in the containment wraps of the fabric.

Although the invention has been shown and described with respect to preferred embodiments thereof, it should be understood by those skilled in the art that various changes and omissions in the form and detail thereof may be made therein without departing from the spirit and scope of the invention.

We claim:

1. A containment structure for a rotary machine which includes:
   an annular beam which is hollow and which extends axially and circumferentially about an axis of symmetry, the beam having a plurality of annular plates extending circumferentially about the interior of the beam which are rigidly attached to the beam for stiffening the beam against radial deflection; and,
   at least two wraps of fabric extending circumferentially about the beam under tension in the installed condition;
wherein the fabric has a free length and an installed length and the installed length of the fabric is greater than the free length of the fabric, wherein at least one wrap is free to move with respect to an adjacent wrap, wherein the annular plates transmit vibrations in the beam to the exterior of the beam, and wherein relative movement of the wraps of the fabric under tension damp s vibrations in the annular beam and absorb s energy from containment particles which penetrate the beam.

2. A containment structure for a rotary machine which includes:
   an annular beam which is hollow and which extends axially and circumferentially about an axis of symmetry, the beam having an outer wall, an inner wall, and a characteristic vibratory pattern at the inner wall which includes spaced nodes and antinodes, the beam further having a plurality of annular plates which are attached to the outer wall, which are attached to the inner wall at said antinodes, and which extend circumferentially about the interior of the beam for stiffening the beam against radial deflection; and,
   a fabric extending circumferentially about the beam under tension in the installed condition, the fabric having an end which is attached to the outer wall and having a free length and an installed length, wherein the installed length of the fabric is greater than the free length of the fabric;
wherein the annular plates transmit vibrations in the beam to the exterior of the beam and wherein the fabric under tension damps vibrations in the annular beam and absorbs energy from containment particles which penetrate the beam.

3. The containment structure of claim 1 or claim 2 wherein each annular plate has a C-shaped cross section formed of a radially extending rib, an axially oriented outer leg and an axially oriented inner leg and wherein each inner leg is attached to the inner wall and each outer leg is attached to the outer wall.

4. The containment structure of claim 3 wherein the tension in the fabric is equal to the tension produced by a load lying in a range of forty-five pounds to fifty-five pounds of force per inch of axial width of the fabric wherein the load is distributed uniformly over and acts tangentially to the fabric on the minimum cross-sectional area presented by the fabric to the load.

5. The containment structure of claim 3 wherein the installed length of the fabric is five percent greater than the free length of the fabric.

6. The containment structure of claim 4 wherein the beam has a first end and a second end spaced axially from the first end, wherein the beam has a first flange at the first end of the beam which adapts the beam to support an axially adjacent first structure and a second flange at the second end which adapts the beam to be supported by an axially adjacent second structure.

7. The containment structure as claimed in claim 6 wherein the fabric is applied in a plurality of wraps, the last wrap of fabric is bonded to the preceding wrap with an epoxy resin, and the exposed fabric has an outer surface and edges, wherein a coating of epoxy resin extends over the edges and the outer surface of the fabric.

8. The containment structure as claimed in claim 5 wherein the beam has a first end and a second end spaced axially from the first end, wherein the beam has a first flange at the first end of the beam which adapts the beam to support an axially adjacent first structure and a second flange at the second end which adapts the beam to be supported by an axially adjacent second structure.

9. The containment structure as claimed in claim 8 wherein the fabric is applied in a plurality of wraps, the last wrap of fabric is bonded to the preceding wrap with an epoxy resin, and the exposed fabric has an outer surface and edges, wherein a coating of epoxy resin extends over the edges and the outer surface of the fabric.

* * * * *